(12) United States Patent
Nitschmann

(10) Patent No.: US 10,161,432 B2
(45) Date of Patent: Dec. 25, 2018

(54) SPREADING CONNECTOR

(71) Applicant: Hafele GmbH & Co. KG, Nagold (DE)

(72) Inventor: Gunter Nitschmann, Nagold (DE)

(73) Assignee: HÄFELE GMBH & CO. KG, Nagold (DE)

( * ) Notice: Subject to any disclaimer, the term of this patent is extended or adjusted under 35 U.S.C. 154(b) by 275 days.

(21) Appl. No.: 14/257,346

(22) Filed: Apr. 21, 2014

(65) Prior Publication Data

US 2014/0356093 A1 Dec. 4, 2014

(30) Foreign Application Priority Data

May 31, 2013 (DE) .................... 20 2013 102 366 U

(51) Int. Cl.
*F16B 12/20* (2006.01)

(52) U.S. Cl.
CPC .......... *F16B 12/2063* (2013.01); *F16B 12/20* (2013.01); *F16B 12/2036* (2013.01);
(Continued)

(58) Field of Classification Search
CPC .... F16B 5/0614; F16B 12/20; F16B 12/2009; F16B 12/2027; F16B 12/2036;
(Continued)

(56) References Cited

U.S. PATENT DOCUMENTS 3,580,535 A * 5/1971 Naske ................. F16B 12/2009
108/107
4,353,663 A * 10/1982 Glickman ............... F16B 12/20
403/230

(Continued)

FOREIGN PATENT DOCUMENTS

DE 1753064 A1 * 7/1971 .......... F16B 12/2036
DE 2610200 A1 * 9/1977 .......... F16B 12/2036
(Continued)

OTHER PUBLICATIONS

Translation of DE1753064A1, worldwide.espacenet.com. Jun. 10, 2016.*

(Continued)

*Primary Examiner* — Ryan D Kwiecinski
(74) *Attorney, Agent, or Firm* — Lucas & Mercanti, LLP; Klaus P. Stoffel

(57) ABSTRACT

A spreading connector for connecting two furniture parts, including a built-in pot having a pot bottom, the pot being pressable, pot bottom first, into a housing bore of a first of the furniture parts. The pot further has a hollow-cylindrical pot wall that has a wall opening and at least one spreading tab that is cut free in the hollow-cylindrical pot wall and is pivotable about an axis running tangentially to the hollow-cylindrical pot wall. A tightening element is rotatably mounted inside the built-in pot for tightening a fastening bolt of a second of the furniture parts which passes through the wall opening. The tightening element has an outer eccentric surface for spreading the at least one spreading tab. The at least one spreading tab has a free tab end that extends in an axial direction away from the pot bottom.

9 Claims, 3 Drawing Sheets

(52) U.S. Cl.
CPC ............. *A47B 2230/0044* (2013.01); *A47B 2230/0048* (2013.01); *F16B 2012/2018* (2013.01)

(58) Field of Classification Search
CPC .......... F16B 12/2063; F16B 2012/2018; F16B 2012/103; F16B 2012/106; F16B 21/04; Y10S 403/12; A47B 2230/0033; A47B 2230/0048; A47B 2230/0044
USPC ..................... 403/DIG. 8, DIG. 12, DIG. 13
See application file for complete search history.

(56) References Cited

U.S. PATENT DOCUMENTS

| | | | | |
|---|---|---|---|---|
| 4,693,630 | A | * | 9/1987 | Giovannetti ............ F16B 7/046 403/231 |
| 5,772,353 | A | * | 6/1998 | Grieser ............... F16B 12/2036 403/231 |
| 2009/0016816 | A1 | * | 1/2009 | Walz .................... F16B 5/0614 403/314 |
| 2010/0202852 | A1 | * | 8/2010 | Krause ................ F16B 12/2027 411/272 |

FOREIGN PATENT DOCUMENTS

| | | | |
|---|---|---|---|
| DE | 20219178 U1 | 3/2003 | |
| DE | 202007009771 U1 | 9/2007 | |
| EP | 1008767 A1 | 6/2000 | |
| EP | 1530926 A2 | 5/2005 | |
| FR | 2333991 A1 * | 7/1977 | .......... F16B 12/2063 |
| GB | 2301412 A | 12/1996 | |
| WO | WO-2009146503 A1 * | 12/2009 | .......... F16B 12/2063 |

OTHER PUBLICATIONS

Machine Translation of DE20219178U1, Mar. 26, 2017, http://translationportal.epo.org/emtp/translate/?ACTION=description-retrieval&COUNTRY=DE&ENGINE=google&FORMAT=docdb&KIND=U1&LOCALE=en_EP&NUMBER=20219178&OPS=ops.epo.org/3.2&SRCLANG=de&TRGLANG=en.*

* cited by examiner

SPREADING CONNECTOR

CROSS-REFERENCE TO RELATED APPLICATIONS

The present application claims priority of DE 20 2013 102 366.3, filed May 31, 2013, the priority of this application is hereby claimed and this application is incorporated herein by reference.

BACKGROUND OF THE INVENTION

The invention relates to a spreading connector for connecting two furniture parts, comprising a built-in pot which can be pressed, pot bottom first, into a housing bore of one furniture part and the hollow-cylindrical pot wall of which has a wall opening and at least one spreading tab which is cut free in the hollow-cylindrical pot wall and is pivotable about an axis running tangentially to the hollow-cylindrical pot wall, as well as a tightening element, rotatably mounted inside the built-in pot, for tightening a fastening bolt of the other furniture part which passes through the wall opening, the tightening element having an outer eccentric surface for spreading the at least one spreading tab.

Such spreading connectors are sufficiently well known for wooden panels or chipboard, for example. For a good function, a firm seat of the spreading connector in the housing bore of the furniture part is to be achieved. This is normally achieved by making the diameter of the built-in pot about 0.5 mm larger than the diameter of the bore, that is to say the spreading connector must be hammered in for this tight fit.

There are also spreading connectors which can simply be pushed into the bore. In such spreading connectors, the rotary movement of the tightening element for tightening the fastening bolt is then also used to spread spreading tabs which are cut free in the hollow-cylindrical pot wall and spread about an axis running tangentially to the hollow-cylindrical pot wall. Because the spreading tabs extend with their free tab end in the direction towards the pot bottom of the built-in pot, spreading takes place not in the wall region of the housing bore close to the surface but in the middle region away from the surface. In the case of chipboard, where the middle region has a significantly lower density and lower strength than the edge regions close to the surface, which edge regions are additionally compressed over the outer 2-3 mm, the maximum spread accordingly lies in the uncompressed middle layer, so that the spreading action here is not optimal.

SUMMARY OF THE INVENTION

In light of the above, the object of the present invention is to improve a spreading connector of the type mentioned at the beginning in such a manner that a better spreading action can be achieved, in particular in chipboard.

The object is achieved according to the invention in that the at least one, in particular U-shaped, spreading tab that is cut out extends with its free tab end in the axial direction away from the pot bottom.

According to the invention, spreading of the spreading tab accordingly takes place in the edge region close to the surface, which edge region is compressed compared to the middle layer, so that the spreading action, or the transmission of force, is optimal.

Preferably, the at least one spreading tab is attached at the end region of the hollow-cylindrical pot wall facing the pot bottom, advantageously spaced apart axially from the pot bottom.

Particularly preferably, the free tab end of the at least one spreading tab is spaced apart axially by at least 1 mm, preferably by at least 2 mm, from a stop edge of the built-in pot that protrudes outwards beyond the hollow-cylindrical pot wall. The free tab end thus forms an undercut which acts contrary to the insertion direction of the built-in pot and which digs into the wood material of the bore wall and provides additional anchoring.

Preferably, the hollow-cylindrical pot wall has at least two spreading tabs which have been cut free and face one another with respect to the tightening element and which each cooperate with an outer eccentric surface of the tightening element.

Further advantages of the invention will become apparent from the description, the claims and the drawing. Likewise, the features mentioned above and those described below may each be used individually or several may be used in any desired combinations. The embodiment which is shown and described is not to be interpreted as being limiting; instead, it is of an exemplary nature to illustrate the invention.

DETAILED DESCRIPTION OF THE INVENTION

Figure 1A:
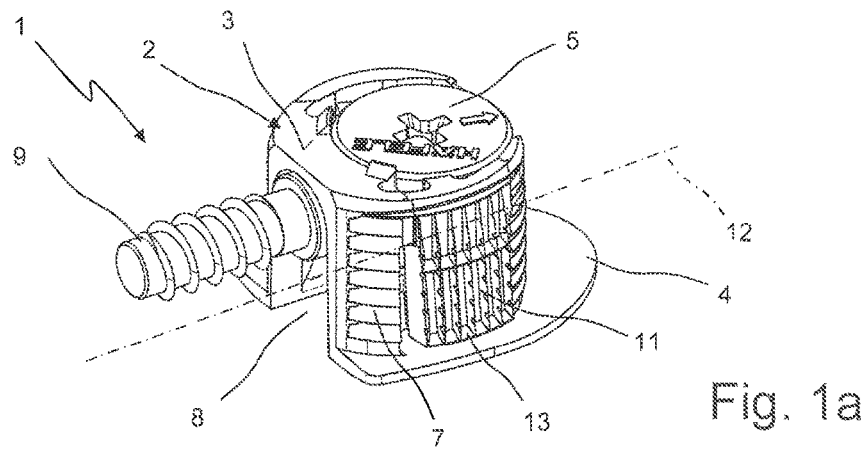
FIGS. 1a-1c show the spreading connector according to the invention in two perspective views (FIGS. 1a, 1b) and in a side view (FIG. 1c)
Figure 1B:
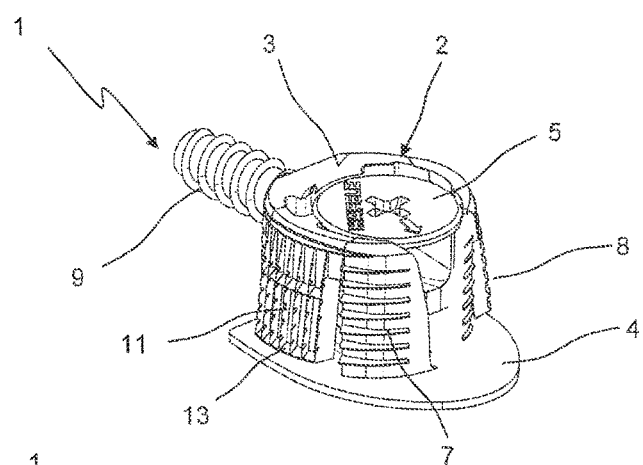
Figure 1C:
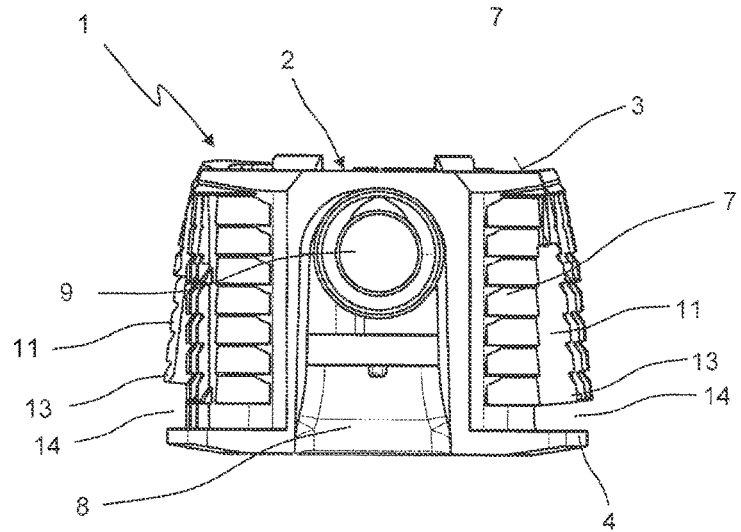
Figure 2A:
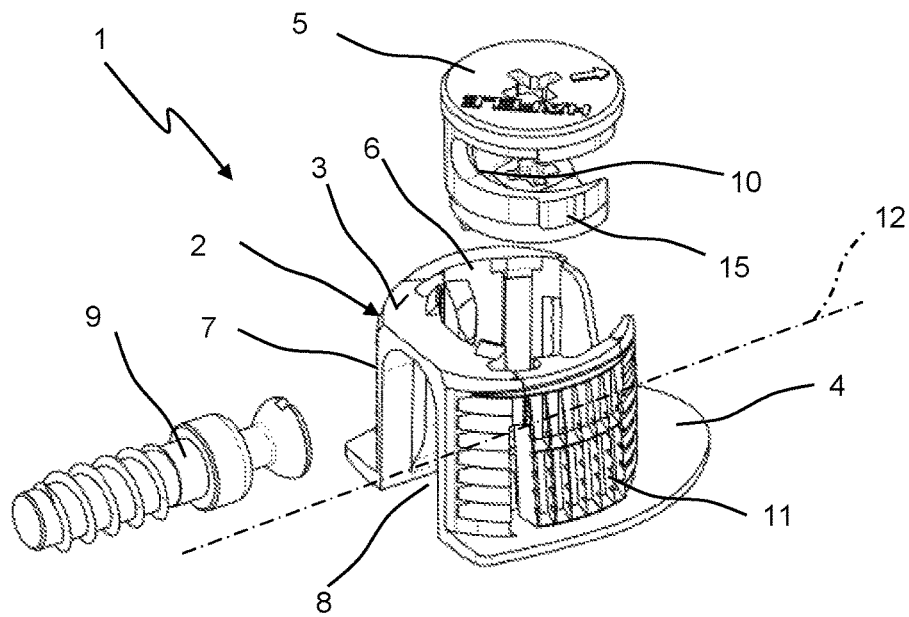
FIGS. 2a, 2b show two different exploded views of the spreading connector according to the invention.
Figure 2B:
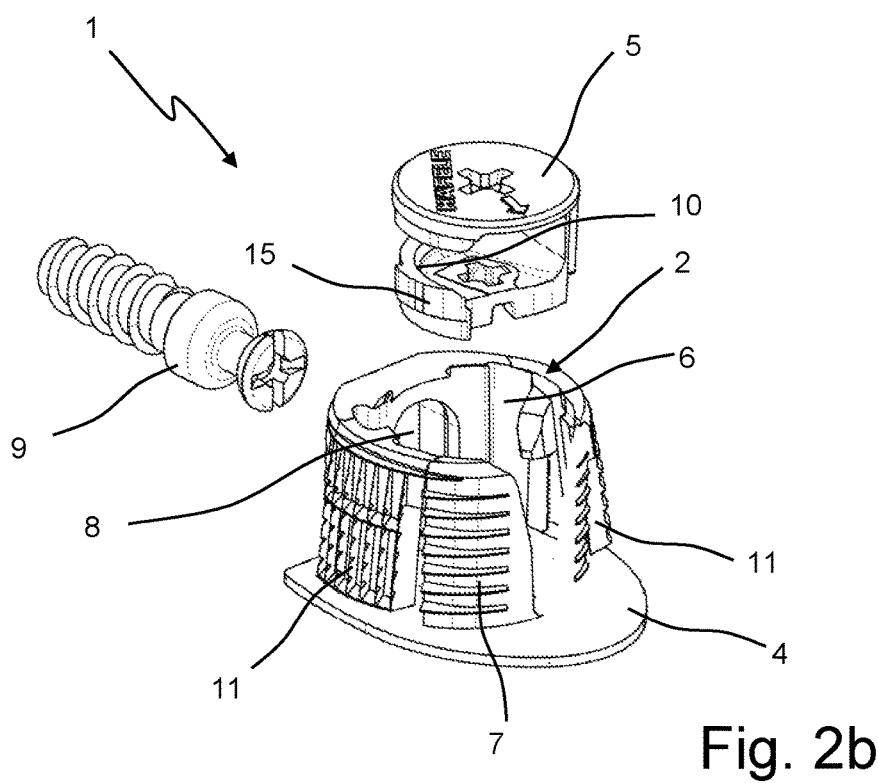

The spreading connector 1 shown in FIGS. 1 and 2 serves to connect two furniture parts (not shown). The spreading connector 1 is shown in the assembled state in FIGS. 1a-1c and in an exploded view in FIGS. 2a, 2b.

The spreading connector 1 comprises a built-in pot 2 (e.g. of plastics material), which is pressed, pot bottom 3 first, into a housing bore of one furniture part until at the other end it abuts the furniture part with a stop edge 4 that protrudes outwards beyond the hollow-cylindrical pot wall 7, as well as a tightening element 5 (e.g. zinc die-casting) which is rotatably mounted inside the built-in pot 2 and which is inserted in a locking manner into the built-in pot 2 via an opening 6 on the pot bottom side.

The built-in pot 2 has in its hollow-cylindrical pot wall 7 a wall opening 8 which is open into the stop edge 4 and through which a fastening bolt 9 of the other furniture part engages through and into the tightening element 5. The tightening element 5 has an inner eccentric surface 10 so that, by rotation of the tightening element 5, it engages beneath the head of the fastening bolt 9 and thereby tightens the fastening bolt 9. The tightening element 5 has on its side remote from the pot bottom 3 a tool receptacle (not shown), for example a cross-slot, in order to allow the tightening element 5 to be rotated when the spreading connector 1 has been pressed in.

Two spreading tabs 11 which face one another with respect to the tightening element 5 are cut free in the hollow-cylindrical pot wall 7, which spreading tabs 11 are attached to the hollow-cylindrical pot wall 7 at the end region of the hollow-cylindrical pot wall 7 facing the pot bottom 3—spaced apart from the pot bottom 3—and are each pivotable about an axis 12 running tangentially to the hollow-cylindrical pot wall 7 and parallel to the pot bottom 3. The two spreading tabs 11 extend with their free tab end 13 in the direction towards the stop edge 4 and are spaced apart therefrom axially, preferably by about 1 to 3 mm. The edges of the free tab ends 13 facing the stop edge 4 thereby each form an undercut which acts contrary to the insertion direction of the built-in pot and which digs into the wood material of a bore wall and provides additional anchoring.

Figure 3A:
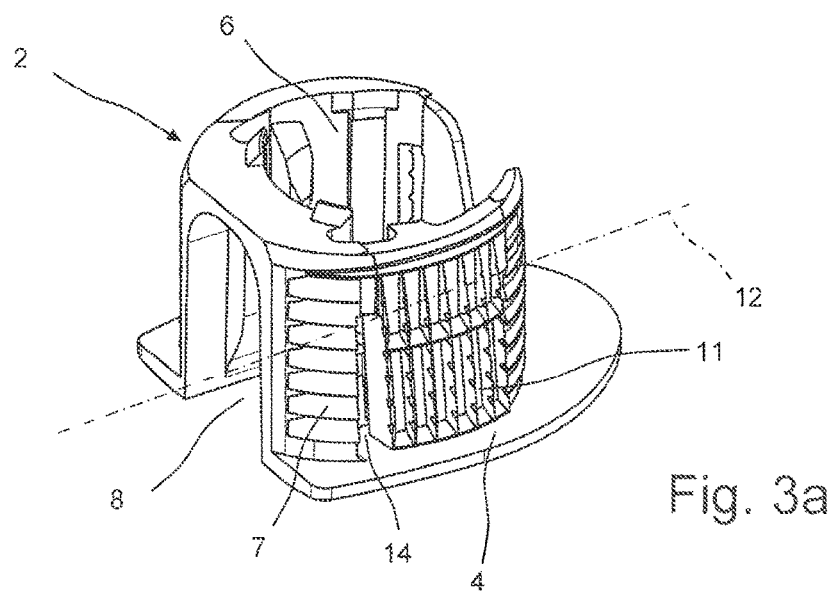
FIGS. 3a, 3b show a built-in pot of the spreading connector according to the invention in a perspective view (FIG. 3a) and in a side view (FIG. 3b).
Figure 3B:
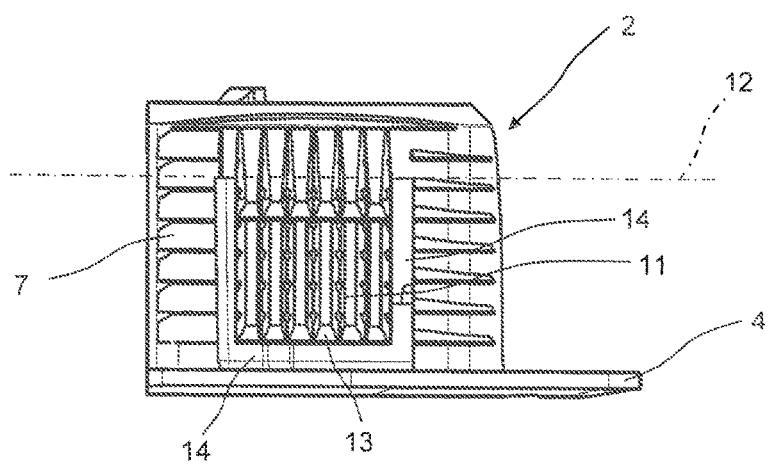

As is shown in FIGS. 3*a*, 3*b*, the two spreading tabs 11 are cut free by a U-shaped cut 14, whereby the hollow-cylindrical pot wall 7 is cut out between the free tab end 13 and the stop edge 4.

The tightening element 5 has two outer eccentric surfaces 15 for spreading the two spreading tabs 11, in order, by rotation of the tightening element 5, to spread the two spreading tabs 11 outwards out of the hollow-cylindrical pot wall 7.

While specific embodiments of the invention have been shown and described in detail to illustrate the inventive principles, it will be understood that the invention may be embodied otherwise without departing from such principles.

I claim:

1. A spreading connector for connecting two furniture parts, comprising: a pot having a pot bottom, the pot being pressable, pot bottom first, into a housing bore of a first of the furniture parts, the pot further having a hollow-cylindrical pot wall that has a wall opening and at least one spreading tab that is cut free in the hollow-cylindrical pot wall and is pivotable about an axis running tangentially to the hollow-cylindrical pot wall; and a tightening element, rotatably mounted inside the pot, for tightening a fastening bolt of a second of the furniture parts which passes through the wall opening, the tightening element having an outer eccentric surface for spreading the at least one spreading tab, wherein the at least one spreading tab has a free tab end that extends in an axial direction away from the pot bottom and is configured to be spread by the outer eccentric surface of the tightening element.

2. The spreading connector according to claim 1, wherein the at least one spreading tab is attached at an end region of the hollow-cylindrical pot wall facing the pot bottom.

3. The spreading connector according to claim 1, wherein the at least one spreading tab is attached to the hollow-cylindrical pot wall so as to be spaced apart axially from the pot bottom.

4. The spreading connector according to claim 1, wherein the free tab end of the at least one spreading tab is spaced apart axially from a stop edge of the pot that protrudes outwards beyond the hollow-cylindrical pot wall.

5. The spreading connector according to claim 4, wherein the free tab end of the at least one spreading tab is spaced apart from the stop edge by at least 1 mm.

6. The spreading connector according to claim 5, wherein the free tab end of the at least one spreading tab is spaced apart from the stop edge by at least 2 mm.

7. The spreading connector according to claim 4, wherein the hollow-cylindrical pot wall is cut out between the free tab end and the stop edge.

8. The spreading connector according to claim 1, wherein the at least one spreading tab is cut free in the hollow-cylindrical pot wall by a U-shaped cut.

9. The spreading connector according to claim 1, wherein the hollow-cylindrical pot wall has at least two spreading tabs which are cut free and face one another with respect to the tightening element.

* * * * *